United States Patent
Iyer et al.

(10) Patent No.: US 9,552,567 B2
(45) Date of Patent: Jan. 24, 2017

(54) COMPUTER-IMPLEMENTED METHODS AND SYSTEMS FOR DETERMINING FLEET CONDITIONS AND OPERATIONAL MANAGEMENT THEREOF

(71) Applicant: General Electric Company, Schenectady, NY (US)

(72) Inventors: Naresh Sundaram Iyer, Saratoga Springs, NY (US); Anil Varma, San Ramon, CA (US); James Kenneth Aragones, Clifton Park, NY (US); Weizhong Yan, Clifton Park, NY (US); Piero Patrone Bonissone, Schenectady, NY (US); Feng Xue, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 148 days.

(21) Appl. No.: 13/728,378

(22) Filed: Dec. 27, 2012

(65) Prior Publication Data
US 2014/0188767 A1   Jul. 3, 2014

(51) Int. Cl.
G06N 99/00    (2010.01)
G06Q 10/08    (2012.01)
G06Q 10/06    (2012.01)

(52) U.S. Cl.
CPC ........ *G06Q 10/087* (2013.01); *G06Q 10/0631* (2013.01)

(58) Field of Classification Search
CPC ...... G06N 99/00; G06N 99/005; G06Q 10/00; G06Q 10/087; G06Q 10/0631
USPC ............................................ 701/29.3; 706/12
See application file for complete search history.

(56) References Cited

U.S. PATENT DOCUMENTS

| 7,187,790 | B2 | 3/2007 | Sabol et al. | |
|---|---|---|---|---|
| 7,490,085 | B2 | 2/2009 | Walker et al. | |
| 2002/0065698 | A1* | 5/2002 | Schick et al. | 705/8 |
| 2004/0073468 | A1* | 4/2004 | Vyas et al. | 705/8 |

(Continued)

OTHER PUBLICATIONS

Rolim, "A Cloud Computing Solution for Patient's Data Collection in Health Care Institutions", Second International Conference on eHealth, Telemedicine, and Social Medicine, ETELEMED '10, pp. 95-99, Feb. 10-16, 2010, St. Maarten.

*Primary Examiner* — Stanley K Hill
*Assistant Examiner* — Dave Misir
(74) *Attorney, Agent, or Firm* — Buckley, Maschoff & Talwalkar LLC

(57) ABSTRACT

A method for determining fleet conditions and operational management thereof, performed by a central system includes receiving fleet data from at least one distributed data repository. The fleet data is substantially representative of information associated with a fleet of physical assets. The method also includes processing the received fleet data for the fleet using at least one process of a plurality of processes. The plurality of processes assess the received fleet data into processed fleet data. The method additionally includes determining a fleet condition status using the processed fleet data and the at least one process of the plurality of processes. The method further includes generating a fleet response. The fleet response is substantially representative of a next operational step for the fleet of physical assets. The method also includes transmitting the fleet response to at least one of a plurality of fleet response recipients.

21 Claims, 3 Drawing Sheets

(56) References Cited

U.S. PATENT DOCUMENTS

| | | |
|---|---|---|
| 2006/0190280 A1* | 8/2006 | Hoebel et al. .................... 705/1 |
| 2007/0118399 A1 | 5/2007 | Avinash et al. |
| 2007/0118502 A1* | 5/2007 | Aragones et al. ................ 707/2 |
| 2007/0124189 A1* | 5/2007 | Stoughton et al. ............... 705/8 |
| 2008/0086321 A1* | 4/2008 | Walton .............................. 705/1 |
| 2008/0154712 A1* | 6/2008 | Wellman ......................... 705/11 |
| 2010/0169108 A1 | 7/2010 | Karkanias et al. |
| 2010/0256794 A1 | 10/2010 | McLaughlin et al. |
| 2010/0256795 A1* | 10/2010 | McLaughlin et al. ........ 700/110 |
| 2010/0299105 A1 | 11/2010 | Vass et al. |
| 2011/0208567 A9* | 8/2011 | Roddy et al. ................ 705/7.41 |
| 2011/0301807 A1* | 12/2011 | Staaf ............................... 701/33 |
| 2012/0166249 A1* | 6/2012 | Jackson ........................ 705/7.28 |
| 2012/0221371 A1* | 8/2012 | Hegazy et al. .............. 705/7.25 |

* cited by examiner

COMPUTER-IMPLEMENTED METHODS AND SYSTEMS FOR DETERMINING FLEET CONDITIONS AND OPERATIONAL MANAGEMENT THEREOF

BACKGROUND

The field of the invention relates generally to computer-implemented programs and, more particularly, to a computer-implemented method and system for determining fleet conditions and operational management thereof.

Asset management generally refers to the combination of engineering, financial, economic, logistical, and other practices applied to a group of physical assets with the objective of providing the required level of service in the most cost-effective manner. It includes the management of the whole life cycle of an asset. This includes design, construction, commissioning, operating, maintaining, repairing, modifying, replacing, decommissioning, and disposal of physical and infrastructure assets. Effective operation and maintenance of assets in a constrained budget environment require some sort of prioritization scheme.

Many known prioritization schemes have employed a time-based paradigm. In such time-based paradigms, asset management is conducted according to a schedule that enhances the availability of replacement parts and human capital to service assets. Such time-based paradigms assume particular life-spans of assets and asset components and accordingly attempt to prioritize the service and replacement of assets and asset components based upon these assumed life-spans. The time-based paradigm was popular, especially with large groupings of assets, due to the significant costs associated with inspection of assets for variance. The benefits of individualized asset management were outweighed by burdens of individual inspections and an unpredictable repair, maintenance, and replacement scheme.

A significant problem with the time-based paradigm is that the assets and asset components may be serviced or replaced prematurely, resulting in sub-optimal physical and human capital investment. Assets and asset components serviced in a time-based paradigm run the risk of unnecessary resource use. For example, the time-based paradigm will cause some assets and asset components to be retired prematurely, and therefore lose asset value in terms of remaining useful life.

Recently, there has been a shift from time-based paradigms to condition-based paradigms. In many known condition-based paradigms, the asset conditions are monitored and assets are flagged or noted for diagnostics, repair, or replacement at the time that the individual asset or asset component requires it based upon measured variances from established parameters. Many such known condition-based paradigms have created logistics problems for fleet management programs. Since the scheduling of diagnostics, repair, or replacement in a condition-based paradigm is dynamic and asynchronous, i.e., assets are scheduled without knowledge of the scheduling of other assets, predictability may suffer. In a time-based paradigm, a known repair schedule may allow for a relatively stable allocation of human resources and inventory. The condition-based paradigm lacks such a schedule, causing variability in asset operation and conditions, in turn causing variability in required human resources and required asset inventory.

This makes fleet management more complex, since there are interdependencies in the demands placed by the various assets on the logistics infrastructure. In a time-based paradigm, these interdependencies can be factored into decision-making due to the relatively stable and static nature of the model. With condition-based paradigms, it becomes harder to account for the interdependencies without looking at the condition of the entire fleet, i.e., in condition-based paradigms, the state of the fleet and information related to it can change quickly and dynamically.

BRIEF DESCRIPTION

In one aspect, a method for determining fleet conditions and operational management thereof is provided. The method is performed by a central system. The central system has at least one computing device. The at least one computing device includes a processor and a memory device coupled to the processor. The method includes receiving fleet data at the central system from at least one distributed data repository. The fleet data is substantially representative of information associated with a fleet of physical assets. The method also includes processing the received fleet data for the fleet of physical assets using at least one process of a plurality of processes. The plurality of processes assess the received fleet data into processed fleet data. The method additionally includes determining a fleet condition status using the processed fleet data and the at least one process of the plurality of processes. The method further includes generating a fleet response. The fleet response is substantially representative of a next operational step for the fleet of physical assets. The method also includes transmitting the fleet response to at least one of a plurality of fleet response recipients.

In a further aspect, a network-based system for determining fleet conditions and operational management thereof for a fleet of physical assets is provided. The system includes a central system having at least one computing device. The at least one computing device includes a processor and a memory device coupled to the processor. The system also includes a central database associated with the central system. The system additionally includes a plurality of supplier client devices associated with a plurality of fleet suppliers. The system further includes a plurality of supplier databases associated with the plurality of fleet suppliers. The system additionally includes a plurality of servicer client devices associated with a plurality of fleet servicers. The system further includes a plurality of servicer databases associated with the plurality of fleet servicers. The network-based system is configured to receive fleet data at the central system from at least one distributed data repository. The fleet data is substantially representative of information associated with a fleet of physical assets. The network-based system is additionally configured to process the received fleet data for the fleet of physical assets using at least one process of a plurality of processes into processed fleet data. The network-based system is also configured to determine a fleet condition status using the processed fleet data and the at least one process of the plurality of processes. The network-based system is further configured to generate a fleet response. The fleet response is substantially representative of a next operational step for the fleet of physical assets. The network-based system is also configured to transmit the fleet response to at least one of a plurality of fleet response recipients.

In another aspect, a computer for determining fleet conditions and operational management thereof is provided. The computer includes a processor and a memory device coupled to the processor. The processor is programmed to receive fleet data from at least one distributed data repository. The fleet data is substantially representative of information associated with a fleet of physical assets. The processor is also programmed to process the received fleet data for the fleet of physical assets into processed fleet data using at least one process of a plurality of processes. The processor is additionally programmed to determine a fleet condition status using the processed fleet data and the at least one process of the plurality of processes. The processor is further programmed to generate a fleet response. The fleet response is substantially representative of a next operational step for the fleet of physical assets. The processor is also programmed to transmit the fleet response to at least one of a plurality of fleet response recipients.

DRAWINGS

These and other features, aspects, and advantages will become better understood when the following detailed description is read with reference to the accompanying drawings in which like characters represent like parts throughout the drawings, wherein.

Figure 1:
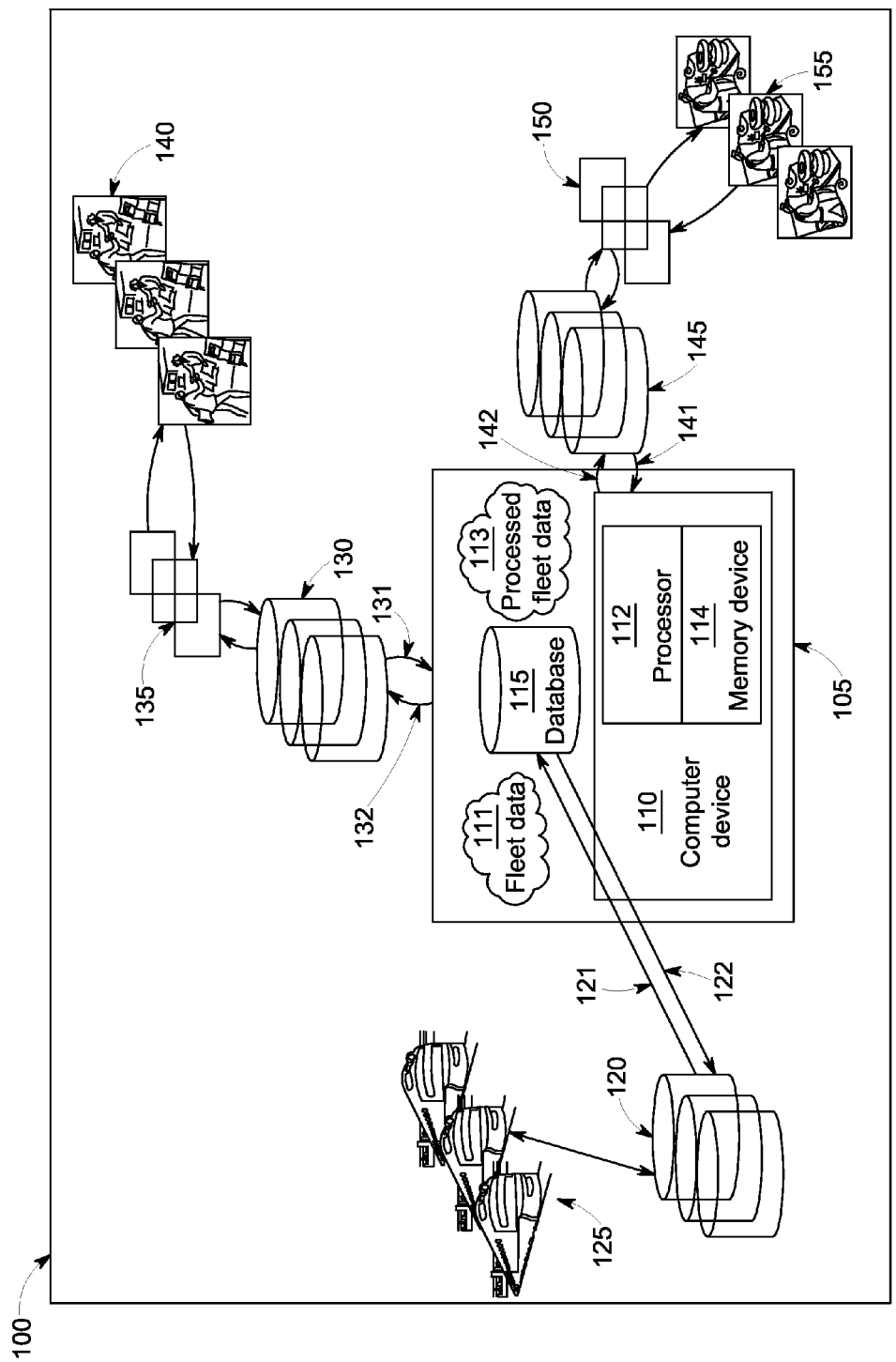
FIG. 1 is a simplified block diagram of a network-based system for determining fleet conditions and operational management thereof for a fleet of physical assets.

Unless otherwise indicated, the drawings provided herein are meant to illustrate key inventive features of the invention. These key inventive features are believed to be applicable in a wide variety of systems comprising one or more embodiments of the invention. As such, the drawings are not meant to include all conventional features known by those of ordinary skill in the art to be required for the practice of the invention.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the terms "software" and "firmware" are interchangeable, and include any computer program stored in memory for execution by devices that include, without limitation, mobile devices, clusters, personal computers, workstations, clients, and servers.

As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the term "client device" and related terms, e.g., "servicer client device" or "supplier client device", refer to devices that can access services at a network-connected server using a client-server architecture. Such client devices may be any computing device with hardware and software that can enable such access to the services of a network-connected server including, without limitation, laptop computers, desktop computers, personal digital assistants, tablet computers, and smart-phones. Also, as used herein, client devices facilitate interactions between the central system, suppliers, and servicers.

As used herein, the term "game theory" and related terms, e.g., "game theory analysis", refers to mathematics-based approaches and techniques to enhance decision-making amongst multiple interrelated parties. Game theory includes, without limitation, simulations of the outcomes of a variety of independent decisions made by multiple interrelated parties, ranking such simulations based upon impact to individual parties individually and as a group, and methods of creating such simulations and rankings. Also, as used herein, game theory facilitates activities that include, without limitation, defining processes for enhanced scheduling and prioritizing of the diagnosis, maintenance, and replacement of assets and asset components.

As used herein, the term "data warehouse" and related terms, e.g., "data warehouse transformation", refers to a centralized data storage facility that receives data from multiple separate data storage facilities. Data warehouses utilize one or a variety of methods to transform the received data to a standard format. These methods may include, without limitation, methods of extraction, loading, and transformation, methods of data normalization, and methods that utilize defined data structures to dynamically alter data types. Also, as used herein, data warehouses facilitate activities that include, without limitation, centralization of asset data, centralization of servicer data, and centralization of supplier data in order to improve data access and efficiency of data processing.

As used herein, the term "ETL" and related terms, e.g., "extraction, transformation, and loading", refers to a known approach for standardizing data formats of non-normalized types to a singular, normalized type. ETL is utilized for simplification of data processing, generally. Also, as used herein, ETL is used to facilitate activities that include, without limitation, data warehousing, and standardized processing of data received from multiple sources.

As used herein, the term "cloud computing" and related terms, e.g., "cloud computing architecture", refer to computer architecture that utilizes multiple computer systems, networks, data storage devices, and database systems for processing scalability, data access, and high-availability computer services. Central to the definition of cloud computing, and distinguishing it from other computer architectures including distributed computing, are the notions that no single computer system, network, data storage device, and/or database system is essential to the architecture, and that cloud computing assets need not be standardized, e.g., to use the same operating system. Cloud computing architecture is designed to allow for the possibility of a variety of components of a cloud computing architecture to enter or leave the architecture at any time or be provisioned for new purposes or in new manners. Generally, cloud computing architecture facilitates highly flexible computer architectures. Cloud computing is a developing area of computer architecture and some specific approaches may evolve. Also, as used herein, cloud computing encompasses architectural approaches known as cloud computing today and in the future. Further, as used herein, cloud computing facilitates activities that include, without limitation, centralizing data into a data warehouse, high-performance analysis of fleet conditions, high-performance game theory analysis, and enabling cloud-based services used by client devices associated with servicers, suppliers, or assets.

As used herein, the term "distributed computing" and related terms, e.g., "distributed computing architecture", refer to computer architecture that utilizes multiple computer systems, networks, and database systems for processing scalability, data access, and high-availability computer services. Although sometimes used synonymously, distributed computing can be distinguished from cloud computing due to a less flexible design. Generally, distributed computing architectures assume a known and fixed amount of components of known types. As cloud computing and distributed computing are used, sometimes, synonymously, the embodiments represented herein that utilize one architecture may also be understood to utilize the alternative architecture.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges included therein unless context or language indicates otherwise.

FIG. 1 is a simplified block diagram of a network-based system 100 for determining fleet conditions and operations for a fleet of physical assets 125. Network-based system 100 includes a central system 105. In the exemplary embodiment, central system 105 includes a computing device 110 and a central database 115.

Network-based system 100 further includes a fleet of physical assets 125. In the exemplary embodiment, fleet of physical assets 125 are locomotives. In alternative embodiments, fleet of physical assets 125 may include any physical assets that be managed with network-based system 100 including, without limitation, automobiles, aviation vehicles, watercraft, manufacturing facilities, power systems including systems for generation, distribution and transformation, chemical plants, commercial or residential buildings, roads, railways, bridges, telecommunications infrastructure, mining and extraction facilities, defense systems, and security systems.

Fleet of physical assets 125 is associated with distributed asset data repositories 120. In the exemplary embodiment where fleet of physical assets 125 are locomotives, distributed asset data repositories 120 include multiple distinct database instances storing data for distinct groupings of assets, e.g., locomotive models or manufacturers, or operational categories, e.g., locomotive location data, locomotive financial data, or locomotive usage data. In alternative embodiments, distributed asset data repositories 120 may be centralized within an asset data warehouse. In these and other alternative embodiments, distributed asset data repositories 120 may also include different categories of data including, without limitation, logistics data, failure incident report data, and efficiency data. Also, in other alternative embodiments, the data may be grouped or categorized in other manners including, without limitation, asset location, asset ownership, asset manufacturer, or asset model year. Distributed asset data repositories 120 are configured to communicate with central database 115.

Network-based system 100 further includes suppliers 140 of fleet of physical assets 125. Suppliers 140 provide inventory to replace assets or asset components in fleet of physical assets 125. Furthermore, in the exemplary embodiment, suppliers 140 have inventory to replace components associated with the locomotives representing fleet of physical assets 125. In alternative embodiments, suppliers 140 can provide any assets or asset components associated with fleet of physical assets 125. Additionally, in the exemplary embodiment, suppliers 140 are located in distinct physical locations and provide identical assets or asset components. In alternative embodiments, suppliers 140 may be located in a variety of physical locations and individual suppliers 140 may provide distinct assets and asset components from other suppliers 140. Moreover, in the exemplary embodiment, suppliers 140 are static, i.e., fixed in type and quantity, and will provide assets or asset components associated with fleet of physical assets 125 managed by network-based system 100. In alternative embodiments, suppliers 140 may change as individual suppliers 140 are added or removed from network-based system 100. Suppliers 140 may be added or removed from network-based system 100 because of technical issues, e.g., connectivity between supplier 140 and central system 105 is interrupted because of network failures, or because of logistical issues, e.g., a contract with supplier 140 is created or terminated.

Suppliers 140 are associated with supplier client devices 135. In the exemplary embodiment, supplier client devices 135 and suppliers 140 are related such that each supplier 140 has one associated supplier client device 135. In alternative embodiments, one supplier 140 or several suppliers 140 may have a plurality of supplier client devices 135 associated with supplier 140 or suppliers 140. In the exemplary embodiment, supplier client devices 135 are desktop computing devices. In alternative embodiments, supplier client devices 135 may include, without limitation, laptop computers, desktop computers, personal digital assistants, tablet computers, smart-phones, and any device with software and hardware capable of communicating with suppliers 140, distributed supplier data repositories 130, central system 105, and network-based system 100.

Supplier client devices 135 are also associated with distributed supplier data repositories 130. Moreover, in the exemplary embodiment, distributed supplier data repositories 130 are multiple distinct database instances storing data for distinct suppliers 140. In alternative embodiments, distributed supplier data repositories 130 may be centralized within one or several data warehouses. The one or several data warehouses may be additionally associated with network-based system 100, suppliers 140, or a third-party.

Network-based system further includes servicers 155 of fleet of physical assets 125. Servicers 155 provide human resources that are capable of providing physical services to diagnose, maintain, or replace fleet of physical assets 125. Moreover, in the exemplary embodiment, servicers 155 have human resources capable of providing physical services associated with the locomotives representing fleet of physical assets 125. In alternative embodiments, servicers 155 may provide any physical services associated with fleet of physical assets 125. In the exemplary embodiment, servicers 155 are located in distinct physical locations and provide identical physical services. In alternative embodiments, servicers 155 may be located in a variety of physical locations and an individual servicer 155 may provide distinct physical services from other servicers 155. For example, one servicer 155 may be capable of only diagnostic services while another may be capable of maintenance services. Alternatively, one servicer 155 may be capable of one class of maintenance services while another servicer 155 may be capable of a different class of maintenance services.

In the exemplary embodiment, servicers 155 are static and will provide physical services associated with fleet of physical assets 125 managed by network-based system 100. In alternative embodiments, servicers 155 may change as individual servicers 155 are added or removed from network-based system 100. Servicers 155 may be added or removed from network-based system 100 because of technical issues, e.g., connectivity between servicer 155 and central system 105 breaks because of network failures, or because of logistical issues, e.g., a contract with servicer 155 is created or terminated. Servicers 155 are associated with servicer client devices 150. Moreover, in the exemplary embodiment, servicer client devices 150 are a plurality of client devices 150 where each servicer 155 has one servicer client device 150 associated with it. In alternative embodiments, one servicer 155 or several servicers 155 may have a plurality of servicer client devices 150 associated with servicer 155 or servicers 155.

Further, in the exemplary embodiment, plurality of servicer client devices 150 are desktop computing devices. In alternative embodiments, plurality of servicer client devices 150 may include, without limitation, laptop computers, desktop computers, personal digital assistants, tablet computers, smart-phones, and any device with software and hardware capable of communicating with servicers 155, distributed servicer data repositories 145, central system 105, and network-based system 100. Plurality of servicer client devices 150 are also associated with distributed servicer data repositories 145. Furthermore, in the exemplary embodiment, distributed servicer data repositories 145 are multiple distinct database instances storing data for distinct servicers 155. In alternative embodiments, distributed servicer data repositories 145 may be centralized within one or several data warehouses. The one or several data warehouses may be additionally associated with network-based system 100, servicers 155, or a third-party. Also, in the exemplary embodiment, servicers 155 and suppliers 140 are physically and actually distinct from one another. In alternative embodiments, some servicers 155 may also act as suppliers 140 and some suppliers 140 may also act as servicers 155.

In alternative embodiments, central system 105 includes plurality of computing devices 110 and employs cloud-based architecture to manage plurality of computing devices 110. In these alternative embodiments, central system 105 may include, with plurality of computing devices 110, and use plurality of client supplier devices 135 and plurality of client servicer devices 150 in a cloud-based architecture to execute methods and processes. In other embodiments, central system 105 includes plurality of computing devices 110 using distributed computing architecture to manage plurality of computing devices 110. In the exemplary embodiment, central database 115 is a data warehouse manifested as one database instance. In alternative embodiments, central database 115 is a data warehouse manifested as a plurality of database instances. In the exemplary embodiment, computing device 110 includes a processor 112 and a memory device 114. In alternative embodiments, computing device 110 includes a plurality of processors 112 and a plurality of memory devices 114 to enable high-performance computing and/or enhanced scalability.

In the exemplary embodiment, central system 105 receives data 121 associated with asset 125 from distributed asset data repositories 120. Furthermore, central system 105 also receives data 131 associated with supplier 140 from distributed supplier data repositories 130 generated by suppliers 140 at plurality of supplier client devices 135. Also, central system 105 further receives data 141 associated with servicer 155 from distributed servicer data repositories 145 generated by servicers 155 at plurality of servicer client devices 150. Received data 121 associated with asset 125, data 131 associated with supplier 140, and data 141 associated with servicer 155 are aggregated and stored as fleet data 111 at central database 115 associated with central system 105.

In the exemplary embodiment, fleet data 111 includes asset data 121 associated with fleet of physical assets 125 where the assets are locomotives. Asset data 121 includes data on, without limitation, geographic locations of locomotives and locomotive assets, mileage or usage data associated with the locomotive and locomotive assets, and fuel efficiency of the locomotive and locomotive assets. Additionally, asset data 121 includes data on, without limitation, weather conditions experienced by the locomotive and locomotive assets, and service and/or maintenance records associated with the locomotive and locomotive assets. Further, asset data 121 includes data on, without limitation, diagnostics associated with the locomotive and locomotive assets, replacement records associated with the locomotive and locomotive assets, and manufacturer data on expected useful life of the locomotive and locomotive assets. Moreover, asset data 121 includes data on, without limitation, data regarding the maintenance and replacement of other similar locomotive fleets, and financial data regarding the net present value of the locomotive and locomotive assets.

In alternative embodiments, fleet data 111 may include asset data 121 related to an alternative fleet of physical assets 125 that may include, without limitation, similar data regarding the location, usage, operational history, operational environment, operator behavior, efficiency, weather conditions, service, maintenance, diagnostics, replacement, manufacturer, or experiences of analogous assets. Furthermore, in the exemplary embodiment, fleet data 111 includes supplier data 131 associated with supplier 140 associated with fleet of physical assets 125 where the assets are locomotives. Moreover, supplier data 131 may include data on, without limitation, the current supply of available replacement locomotive and locomotive assets, the location of available replacement locomotives and locomotive assets, the cost for replacement locomotives and locomotive assets, the time to deliver replacement locomotives and locomotive assets, the models of available replacement locomotives and locomotive assets, the age of available replacement locomotives and locomotive assets, and historic demand for replacement locomotives and locomotive assets.

In alternative embodiments, fleet data 111 may include, without limitation, similar supplier data 131 associated with an alternative fleet of physical assets 125 regarding the inventory count, location, cost, time to deliver, models available, ages available, and historic demand for assets or asset components provided by suppliers 140. Also, in the exemplary embodiment, fleet data 111 includes servicer data 141 associated with servicers 155 associated with fleet of physical assets 125 where the assets are locomotives. Additionally, servicer data 141 may include data on, without limitation, the current supply of servicers available to diagnose or maintain locomotives and locomotive assets and the schedule of servicers available to diagnose or maintain locomotives and locomotive assets. Furthermore, servicer data 141 may include data on the hourly cost or fixed cost associated with diagnostic or maintenance services provided by servicers available to diagnose or maintain locomotives and locomotive assets. Additionally, servicer data 141 may include data on the geographic location of servicers 155 available to diagnose or maintain locomotives and locomotive assets. Also, servicer data 141 may include data on the success rates or other indicia of quality of servicers 155 available to diagnose or maintain locomotives and locomotive assets. In alternative embodiments, fleet data 111 may include, without limitation, similar servicer data 141 associated with an alternative fleet of physical assets 125 regarding the availability of servicers 155, the schedule of servicers 155, the hourly or fixed cost of servicers 155, the geographic location of servicers 155, and the quality of servicers 155.

In operation, central system 105 creates processed fleet data 113 at processor 112, using fleet data 111. Processed fleet data 113 is stored at central database 115. Creating processed fleet data 113 utilizes data warehousing techniques to standardize received data 121 associated with asset 125, data 131 associated with supplier 140, and data 141 associated with servicer 155, and facilitate determining fleet conditions and operational management.

Central system 105 further determines a fleet condition status (not shown) at processor 112 using processed fleet data 113. Moreover, in the exemplary embodiment fleet condition status is determined at processor 112 in central system 105 computing device 110. In alternative embodiments, the fleet condition status is determined at processor 112 and stored at memory device 114 to facilitate resilience of network-based system 100 in the event of system resets, outages, or losses of connectivity. Also, in other embodiments, fleet condition status is determined at processor 112 and stored at central database 115 to enable post-operations analysis.

Central system 105 then determines, at processor 112, a fleet response (not shown) which includes sending at least one of a first next operational step 122 for fleet of physical assets 125, a second next operational step 132 for suppliers 140, and a third next operational step 142 for servicers 155.

First next operational step 122 for fleet of physical assets 125 may include, without limitation, a request for more information regarding fleet of physical assets 125. Additionally, first next operational step 122 for fleet of physical assets 125 may include an instruction to receive a diagnosis from servicer 155 along with a schedule and priority for such diagnosis. Moreover, first next operational step 122 for fleet of physical assets 125 may include an instruction to receive physical servicing from servicer 155 along with a schedule and priority for such physical servicing. Also, first next operational step 122 for fleet of physical assets 125 may include an instruction to receive replacement assets or asset components from supplier 140 along with a schedule and priority for such replacement. Furthermore, first next operational step 122 for fleet of physical assets 125 may include an instruction to deactivate or decommission assets from fleet of physical assets 125. Additionally, first next operational step 122 for fleet of physical assets 125 may include an instruction to wait for further response from central system 105.

Second next operational step 132 for suppliers 140 may include, without limitation, an instruction to supply assets or asset components associated with fleet of physical assets 125 along with a requested schedule and priority for such supplying. Additionally, second next operational step 132 for suppliers 140 may include an instruction to obtain more assets or asset components associated with fleet of physical assets 125 along with a timeline for obtaining such assets or asset components. Moreover, second next operational step 132 for suppliers 140 may include an instruction to cancel a previous instruction to supply assets or asset components associated with fleet of physical assets 125 along with parameters for such a cancellation. Furthermore, second next operational step 132 for suppliers 140 may include an instruction to reprioritize or reschedule the supplying of assets or asset components from fleet of physical assets 125.

Third next operational step 142 for servicers 155 may include, without limitation, an instruction to diagnose an asset from fleet of physical assets 125 along with a schedule and priority for such diagnosis, an instruction to service an asset from fleet of physical assets 125 along with a schedule and priority for such physical servicing. Also, third next operational step 142 for servicers 155 may include an instruction to cancel the service of an asset from fleet of physical assets 125 along with parameters for such a cancellation. Additionally, third next operational step 142 for servicers 155 may include an instruction to reprioritize or reschedule the servicing of assets or asset components from fleet of physical assets 125. Furthermore, third next operational step 142 for servicers 155 may include an instruction to obtain more human resources to service fleet of physical assets 125 along with a timeline for obtaining such human resources. Also, third next operational step 142 for servicers 155 may include an instruction to deactivate or decommission an asset or assets from fleet of physical assets 125.

Figure 2:
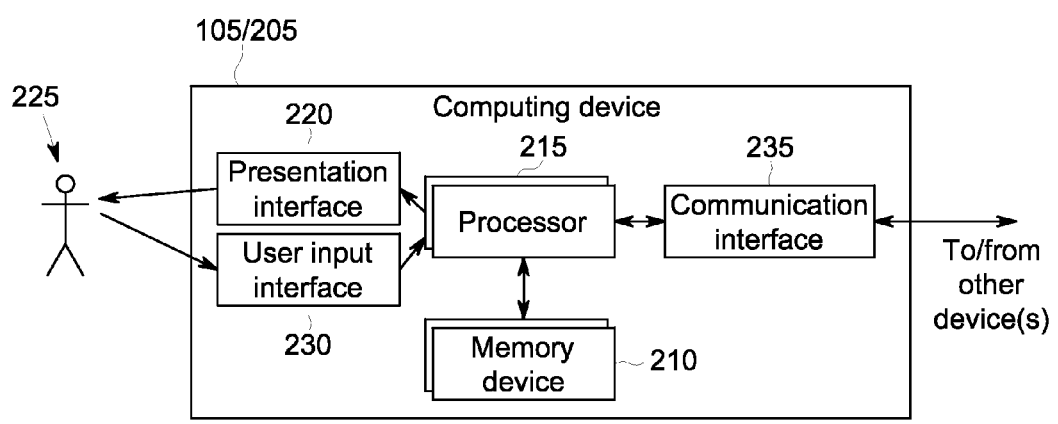
FIG. 2 is a block diagram of an exemplary computing device known as a central system that may be used with the network-based system shown in FIG. 1.

FIG. 2 is a block diagram of an exemplary computing device 205 that illustrates an embodiment of central system 105 that may be used to provide monitoring, diagnostics, sustainment, and management system for a fleet of physical assets 125 (both shown in FIG. 1). Computing device 205 includes a memory device 210 and a processor 215 operatively coupled to memory device 210 for executing instructions. In the exemplary embodiment, computing device 205 includes a single processor 215 and a single memory device 210. In alternative embodiments, computing device 205 may include a plurality of processors 215 and/or a plurality of memory devices 210. In some embodiments, executable instructions are stored in memory device 210. Computing device 205 is configurable to perform one or more operations described herein by programming processor 215. For example, processor 215 may be programmed by encoding an operation as one or more executable instructions and providing the executable instructions in memory device 210.

In the exemplary embodiment, memory device 210 is one or more devices that enable storage and retrieval of information such as executable instructions and/or other data. Memory device 210 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Memory device 210 may be configured to store operational data including, without limitation, fleet data 111 (shown in FIG. 1), processed fleet data 113 (shown in FIG. 1), and/or any other type of data. In some embodiments, processor 215 removes or "purges" data from memory device 210 based on the age of the data. For example, processor 215 may overwrite previously recorded and stored data associated with a subsequent time and/or event. In addition, or alternatively, processor 215 may remove data that exceeds a predetermined time interval. Also, memory device 210 includes, without limitation, sufficient data, algorithms, and commands to facilitate operation (discussed below) of system 100 (shown in FIG. 1).

In some embodiments, computing device 205 includes a user input interface 230. In the exemplary embodiment, user input interface 230 is coupled to processor 215 and receives input from user 225. User input interface 230 may include, without limitation, a keyboard, a pointing device, a mouse, a stylus, a touch sensitive panel, e.g., without limitation, a touch pad or a touch screen, and/or an audio input interface, e.g., without limitation, including a microphone. A single component, such as a touch screen, may function as both a display device of presentation interface 220 and user input interface 230.

A communication interface 235 is coupled to processor 215 and is configured to be coupled in communication with one or more other devices, such as a sensor or another computing device 205, and to perform input and output operations with respect to such devices. For example, communication interface 235 may include, without limitation, a wired network adapter, a wireless network adapter, a mobile telecommunications adapter, a serial communication adapter, and/or a parallel communication adapter. Communication interface 235 may receive data from and/or transmit data to one or more remote devices. For example, a communication interface 235 of one computing device 205 may transmit an alarm to communication interface 235 of another computing device 205. Communications interface 235 facilitates machine-to-machine communications, i.e., acts as a machine-to-machine interface.

Presentation interface 220 and/or communication interface 235 are both capable of providing information suitable for use with the methods described herein, e.g., to user 225 or another device. Accordingly, presentation interface 220 and communication interface 235 may be referred to as output devices. Similarly, user input interface 230 and communication interface 235 are capable of receiving information suitable for use with the methods described herein and may be referred to as input devices.

In the exemplary embodiment, user 225 may use computing device 205 by receiving information on fleet condition (not shown) and operation via presentation interface 220. User 225 may act on the information presented and use computing device 205 to affect the operation of fleet of physical assets 125 (shown in FIG. 1). User 225 may initiate such an action via user input interface 230 which processes the user command at processor 215 and uses communication interface 235 to communicate with other devices. These other devices may include, without limitation, plurality of client supplier devices 135 (shown in FIG. 1) associated with suppliers 140 (shown in FIG. 1) or plurality of client servicer devices 150 (shown in FIG. 1) associated with servicers 155 (shown in FIG. 1).

Computing device 205 is a representative of central system 105. In at least some other embodiments, computing device 205 is also representative of plurality of client servicer devices 150 and plurality of client supplier devices 135. In most embodiments, computing device 205 at least illustrates the primary design of plurality of client servicer devices 150 and plurality of client supplier devices 135.

Figure 3:
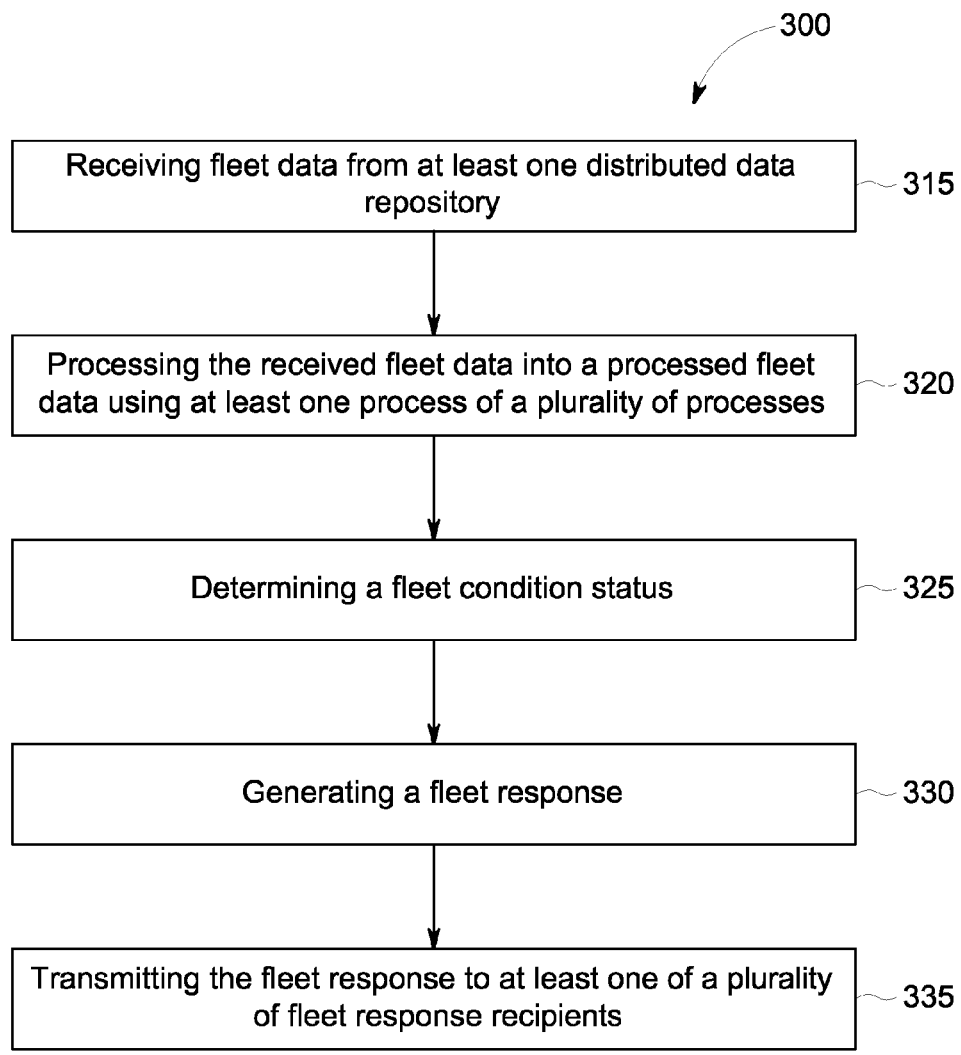
FIG. 3 is flow chart of an exemplary method for determining fleet conditions and operational management thereof for a fleet of physical assets that may be used with the system shown in FIG. 1.

FIG. 3 is flow chart of an exemplary method 300 performed by central system 105 (shown in FIG. 1) for determining fleet conditions and operations for a fleet of physical assets 125 (shown in FIG. 1) that may be used with network-based system 100 (shown in FIG. 1).

In the exemplary method 300, fleet data 111 (shown in FIG. 1) is received 315 from at least one distributed data repository where distributed data repository may be distributed asset data repositories 120 (shown in FIG. 1) transmitting asset data 121 (shown in FIG. 1), distributed supplier data repositories 130 (shown in FIG. 1) transmitting supplier data 131 (shown in FIG. 1), and distributed servicer data repositories 145 (shown in FIG. 1) transmitting servicer data 141 (shown in FIG. 1).

Received fleet data 111 is processed 320 into processed fleet data 113 (shown in FIG. 1) using at least one of a plurality of processes. Also, in the exemplary embodiment, the plurality of processes first employs the use of extraction, transformation, and loading (ETL) on received fleet data. Further, in the exemplary embodiment, the plurality of processes further employs categorizing fleet data 111 for simplified processing. For an example of such categorizing, particular servicers 155 (shown in FIG. 1) may be categorized with regard to proximity to particular assets from fleet of physical assets 125. Moreover, in an alternate example, particular servicers 155 may be categorized based upon time to fulfill a servicing request. In alternative embodiments, the plurality of processes may not use ETL but instead employ other techniques to standardize fleet data 111 for efficient processing. Furthermore, in some embodiments, portions of fleet data 111 may be unavailable to central system 105. Unavailability of portions of fleet data 111 may be caused by several events including, without limitation, network outages, server failures, and data corruption. In these embodiments, processing received fleet data 111 into processed fleet data 113 using at least one of a plurality of processes may further include extrapolating of processed fleet data 113. Methods for extrapolating processed fleet data 113 may include, without limitation, using historic data for baselines of processed fleet data 113 and using analogous data from other similar fleets of physical assets 125. In alternative embodiments where portions of fleet data 111 are unavailable to central system 105, processing received fleet data 111 into processed fleet data 113 using at least one of a plurality of processes may further include sending requests (not shown) for more information to fleet of physical assets 125, suppliers 140 (shown in FIG. 1), or servicers 155.

The method also includes determining a fleet condition status 325 using processed fleet data 113 and the at least one process of the plurality of processes. In the exemplary embodiment, determining a fleet condition status 325 using processed fleet data 113 represents determining, for at least one of the assets in fleet of physical assets 125 a condition. The condition includes, without limitation, the remaining useful life for the asset or asset component and a designation of need for diagnostics to be performed on an asset or assets. Further, the condition includes a designation of need for maintenance to be performed on an asset or assets. Moreover, the condition includes a designation of need for replacement of an asset, assets, or asset components and a designation of need for an asset or assets to be deactivated or decommissioned. In alternative embodiments, the condition may include a health assessment where the health assessment allows for comparisons between the conditions of physical assets 125 without a precise measurement (e.g., remaining useful life) associated.

In the exemplary embodiment, the plurality of processes includes analyzing a repository of historical data (not shown), creating an expert data model (not shown), and machine learning (not shown). Analyzing a repository of historical data refers to the use of historic fleet data (not shown) where the historic fleet data includes historic data analogous to processed fleet data 113, historic fleet responses (not shown), and the resulting conditions (not shown) of fleet assets and fleet asset components. Historic fleet responses are analogous to a first next operational step 122 (shown in FIG. 1) for fleet of physical assets 125, a second next operational step 132 (shown in FIG. 1) for suppliers 140, and a third next operational step 142 (shown in FIG. 1) for servicers 155. Creating an expert data model (not shown) refers to incorporating expert user input to construct a data model that correlates processed fleet data 113 to a fleet condition status. In the exemplary embodiment, an expert user 225 (shown in FIG. 2) may enter input to construct the model at computing device 110 (shown in FIG. 1). Machine learning (not shown) refers to the use of heuristic algorithms in order to predict a fleet condition status (not shown) based upon patterns determined by central system 105 (shown in FIG. 1) assessing processed fleet data 113 (shown in FIG. 1).

In some embodiments, determining a fleet condition status 325 includes determining a first forecast (not shown) for an availability of parts to maintain fleet of physical assets 125, determining a second forecast (not shown) for an availability of human resources for service of fleet of physical assets 125, and determining a third forecast (not shown) of material conditions of each asset of fleet of physical assets 125. In these some embodiments, the first, second, and third forecast are included in the fleet condition status and used to generate a fleet response 330.

The method further includes generating a fleet response 330. Generating a fleet response 330 is substantially representative of generating a first next operational step 122 for fleet of physical assets 125, a second next operational step 132 for suppliers 140, and a third next operational step 142 for servicers 155. Also, in the exemplary embodiment, generating a fleet response 330 includes identifying an availability of parts to maintain fleet of physical assets 125. Generating a fleet response 330 further includes identifying an availability of human resources for service of fleet of physical assets 125. Additionally, generating a fleet response 330 includes applying at least one of a plurality of decision algorithms to determine the next operational step where the next operational step includes a first next operational step 122, a second next operational step 132, and a third next operational step 142. Moreover, in the exemplary embodiment, the at least one of a plurality of decision algorithms simulate various outcomes for fleet of physical assets 125 when servicers 155 and suppliers 140 allocate and prioritize their physical and human resources in various ways for each asset in fleet of physical assets 125 which requires the use of servicers 155 or suppliers 140. Such allocations and prioritizations by servicers 155 and suppliers 140 represent servicers 155 and suppliers 140 providing diagnostic, replacement, maintenance, and other services for fleet of physical assets 125.

In the exemplary embodiment, the plurality of decision algorithms apply game theory to these simulations. Game theory is applied to model the optimal resource allocation that each asset in fleet of physical assets 125 should request given requests made by other assets in fleet of physical assets 125.

For example, an algorithm using game theory may be used to identify an optimal servicer 155. This algorithm may consider the physical location of a servicer 155 and identify that servicer 155 is sub-optimal due such a location when a request is made in relation to a particular asset. However, the algorithm may further simulate accelerated servicing of several other assets from fleet of physical assets 125 and identify that the benefits of the proximity of servicer 155 to the first asset can outweigh the costs of such accelerated servicing of the several other assets.

In another example, an algorithm using game theory may help drive cost efficiency in replacement of an asset component. In this example, the replacement cost of an asset may appear to be high when the asset is the only one in fleet 125 requiring replacement. However, the algorithm may simulate the replacement of several other assets nearing the end of their remaining useful life. In this example, purchasing replacement may result in a volume-based-discount, bringing down the average cost of each asset. The algorithm may show that the benefits of reduced average cost of each replacement asset outweigh the costs of premature replacement.

In a final illustrative example, an algorithm using game theory may result in an asset being decommissioned or deactivated to maximize the remaining useful life of fleet 125. In this example, a particular asset may have some remaining useful life given the replacement of an asset component by a servicer 155 and a supplier 140. However, in this example, the asset component is scarce and a second asset would gain more remaining useful life if its asset component was replaced by a servicer 155 and a supplier 140. In these and other simulations, game theory algorithms allow for network-based system 100 to evaluate how independent fleet management decisions can impact one another.

In the exemplary embodiment, the plurality of decision algorithms further apply a variety of criteria to the simulations created by applying game theory to simulations. In the exemplary embodiment, the variety of criteria may include, without limitation, maximizing remaining useful life of assets, minimizing interruptions to the functions associated with assets, minimizing total costs associated with the management of fleet of assets 125, and combinations of these and/or other criteria. In the exemplary embodiment, the plurality of decision algorithms run in real-time, modeling for scenarios that enhance for a particular criteria. In this embodiment, given the constant fluctuation of human resources, asset inventory, total costs, and service levels, the real-time processing allows for enhanced benefit for network-based system 100 that would otherwise be difficult to obtain. In alternative embodiments, criteria may be determined based upon user-input where a user 225 (shown in FIG. 2) may specify the criteria that should be used to find optimal scenarios when applying the plurality of decision algorithms. In these alternative embodiments, the criteria may be entered by the user 225 at central system 105 using computing device 110 which is exemplarily embodied as computing device 205 (shown in FIG. 2). In these alternative embodiments, the criteria may be entered by user 225 in real-time. In other alternative embodiments, the criteria may be entered by user 225 and scheduled to run at a different time.

The method also includes transmitting 335 the fleet response to at least one of a plurality of fleet response recipients. Fleet response recipients include, without limitation, fleet suppliers 140, fleet servicers 155, or fleet of physical assets 125. Transmitting 335 the fleet response may include, without limitation, sending messages or instructions derived from generating fleet response 330 to fleet response recipients by means of electronic mail, SMS messaging, faxes, telephonic communication, instant messaging, or wireless communication. Transmitting fleet response 335 may further include, without limitation, updating distributed asset data repositories 120 (shown in FIG. 1), distributed supplier data repositories 130 (shown in FIG. 1), distributed servicer data repositories 145 (shown in FIG. 1), and central database 115 (shown in FIG. 1). Transmitting fleet response 335 may further include, without limitation, commandeering and controlling plurality of client servicer devices 150 (shown in FIG. 1) and/or plurality of client supplier devices 135 (shown in FIG. 1) to automate the scheduling and/or prioritizing of supplies or services to be delivered to fleet of physical assets 125.

The computer-implemented systems and methods as described herein facilitate increasing the remaining useful life of a fleet of physical assets, increasing the cost efficiency of the management and servicing of a fleet of physical assets, and otherwise enhancing the condition-based management of a fleet of physical assets based upon management priorities.

An exemplary technical effect of the methods and computer-implemented systems described herein includes at least one of (a) enhancing the physical servicing and/or maintenance of real world physical assets to attain desirable increases in remaining useful life of the physical assets; (b) enhancing the replacement of components of real world assets to attain desirable increases in remaining useful life of the physical assets; and (c) determining diagnosis and prognosis of conditions of physical assets within a fleet of physical assets to attain desirable increases in remaining useful life of the physical assets.

Exemplary embodiments of computer-implemented systems and methods for determining fleet conditions and operational management thereof for a fleet of physical assets are described above in detail. The computer-implemented systems and methods of operating such systems are not limited to the specific embodiments described herein, but rather, components of systems and/or steps of the methods may be utilized independently and separately from other components and/or steps described herein. For example, the methods may also be used in combination with other enterprise systems and methods, and are not limited to practice with only the methods and systems for determining fleet conditions and operational management thereof, as described herein. Rather, the exemplary embodiment can be implemented and utilized in connection with many other enterprise applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for determining fleet conditions and operational management thereof, wherein said method is performed by a central system having at least one computing device including a processor and a memory device coupled to the processor, said method comprising:
   receiving fleet data at the central system from at least one distributed data repository, the fleet data substantially representative of information associated with a fleet of at least two physical assets;
   processing, at the central system, the received fleet data for the fleet of physical assets using at least one process of a plurality of processes, the plurality of processes assessing the received fleet data into processed fleet data;
   determining, at the central system, a fleet condition status for the at least two physical assets using the processed fleet data and the at least one process of the plurality of processes;
   generating, at the central system, a fleet response that is substantially representative of a next operational step for the fleet of at least two physical assets, wherein using game theory analysis, the next operational step provides an optimal resource allocation to a first physical asset in the fleet based on resource allocation to other physical assets in the fleet; and
   transmitting the fleet response to at least one of a plurality of fleet response recipients.

2. The method in accordance with claim 1, wherein the fleet condition status is substantially representative of at least one of a plurality of condition states of at least one asset associated with an asset type associated with the fleet of physical assets.

3. The method of claim 1, wherein receiving fleet data comprises:
   receiving fleet data at the central system from at least one distributed data repository, wherein the received fleet data is one of incomplete or partially complete;
   generating estimated fleet data comprising estimating a portion of the fleet data not received based upon previously received fleet data; and
   incorporating the estimated fleet data with the received fleet data.

4. The method of claim 1, wherein generating a fleet response comprises:
   identifying an availability of parts to maintain the fleet of physical assets;
   identifying an availability of human resources for service of the fleet of physical assets; and
   applying at least one of a plurality of decision algorithms to determine the next operational step.

5. The method of claim 1, wherein generating a fleet response comprises prioritizing, for each asset of the fleet of physical assets, ordering of parts and scheduling human resources to service the physical assets based upon an asset condition.

6. The method of claim 1, wherein determining a fleet condition status comprises:
   determining a first forecast for an availability of parts to maintain the fleet of physical assets;
   determining a second forecast for an availability of human resources for service of the fleet of physical assets; and
   determining a third forecast of material conditions of each asset of the fleet of assets, the third forecast substantially representative of a predicted condition.

7. The method of claim 1, wherein determining a fleet condition status includes at least one or a combination of:
   analyzing a repository of historical fleet data and historical fleet responses;
creating an expert data model; and
   machine learning.

8. The method of claim 1, wherein the fleet condition status includes an indication of at least one of a health assessment, remaining useful life, need for diagnostics, need for maintenance, need for replacement and need for deactivation.

9. A network-based system for determining fleet conditions and operational management thereof for a fleet of at least two physical assets, said system comprising:
   a central system having at least one computing device including a processor and a memory device coupled to said processor;
   a central database associated with said central system;
   a plurality of supplier client devices associated with a plurality of fleet suppliers;
   a plurality of supplier databases associated with the plurality of fleet suppliers;
   a plurality of servicer client devices associated with a plurality of fleet servicers; and
   a plurality of servicer databases associated with the plurality of fleet servicers, said network-based system configured to:
      receive fleet data at the central system from at least one distributed data repository, the fleet data substantially representative of information associated with a fleet of at least two physical assets;
      process, at the central system, the received fleet data for the fleet of physical assets using at least one process of a plurality of processes, the plurality of processes assessing the received fleet data into processed fleet data;
      determine, at the central system, a fleet condition status for the at least two physical assets using the processed fleet data and the at least one process of the plurality of processes;
      generate, at the central system, a fleet response that is substantially representative of a next operational step for the fleet of at least two physical assets, wherein using game theory analysis the next operational step provides an optimal resource allocation to a first physical asset in the fleet based on resource allocation to other physical assets in the fleet; and
      transmit the fleet response to at least one of a plurality of fleet response recipients.

10. The network-based system in accordance with claim 9, wherein the fleet condition status is substantially representative of at least one of a plurality of condition states of at least one asset associated with an asset type associated with the fleet of physical assets.

11. The network-based system of claim 9, wherein said network-based system configured to receive fleet data is further configured to:
   receive fleet data at the central system from at least one distributed data repository, wherein the received fleet data is one of incomplete or partially complete;
   generate estimated fleet data, comprising estimating a portion of the fleet data not received based upon previously received fleet data; and
   incorporate the estimated fleet data with the received fleet data.

12. The network-based system of claim 9, wherein said network-based system configured to generate a fleet response is further configured to:
   identify an availability of parts to maintain the fleet of physical assets;
   identify an availability of human resources for service of the fleet of physical assets; and
   apply at least one of a plurality of decision algorithms to determine the next operational step.

13. The network-based system of claim 9, wherein said network-based system configured to generate a fleet response is further configured to prioritize, for each asset of the fleet of physical assets, ordering of parts and scheduling human resources to service the physical assets based upon an asset condition.

14. The network-based system of claim 9, wherein said network-based system configured to determine a fleet condition is further configured to:
   determine a first forecast for an availability of parts to maintain the fleet of physical assets;
   determine a second forecast for an availability of human resources for service of the fleet of physical assets; and
   determine a third forecast of material conditions of each asset of the fleet of assets, the third forecast substantially representative of a predicted condition.

15. The network-based system of claim 9, wherein said network-based system configured to determine a fleet condition is further configured to include at least one or a combination of:
   analyze a repository of historical fleet data and historical fleet responses;
   create an expert data model; and
   machine learning.

16. A computer for determining fleet conditions and operational management thereof, said computer comprising a processor and a memory device coupled to said processor, said processor programmed to:
   receive fleet data from at least one distributed data repository, the fleet data substantially representative of information associated with a fleet of at least two physical assets;
   process the received fleet data for the fleet of physical assets using at least one process of a plurality of processes, the plurality of processes assessing the received fleet data into processed fleet data;
   determine a fleet condition status for the at least two physical assets using the processed fleet data and the at least one process of the plurality of processes;
   generate a fleet response, the fleet response substantially representative of a next operational step for the fleet of at least two physical assets, wherein using game theory analysis the next operational step provides an optimal resource allocation to a first physical asset in the fleet based on resource allocation to other physical assets in the fleet; and
   transmit the fleet response to at least one of a plurality of fleet response recipients.

17. The computer in accordance with claim 16, wherein the fleet condition status is substantially representative of at least one of a plurality of condition states of at least one asset associated with an asset type associated with the fleet of physical assets.

18. The computer of claim 16, wherein said processor programmed to receive fleet data is further programmed to:
   receive fleet data at a central system from at least one distributed data repository, wherein the received fleet data is one of incomplete or partially complete;
   generate estimated fleet data, comprising estimating a portion of the fleet data not received based upon previously received fleet data; and
   incorporate the estimated fleet data with the received fleet data.

19. The computer of claim 16, wherein said processor programmed to generate a fleet response is further programmed to:
   identify an availability of parts to maintain the fleet of physical assets;
   identify an availability of human resources for service of the fleet of physical assets; and
   apply at least one of a plurality of decision algorithms to determine the next operational step.

20. The computer of claim 16, wherein said processor programmed to generate a fleet response is further programmed to prioritize, for each asset of the fleet of physical assets, ordering of parts and scheduling human resources to service the physical assets based upon an asset condition.

21. The computer of claim 16, wherein said processor programmed to determine a fleet condition status is further programmed to:
   determine a first forecast for an availability of parts to maintain the fleet of physical assets;
   determine a second forecast for an availability of human resources for service of the fleet of physical assets; and
   determine a third forecast of material conditions of each asset of the fleet of assets, the third forecast substantially representative of a predicted condition.

\* \* \* \* \*